United States Patent
Kuroda et al.

(10) Patent No.: US 6,191,932 B1
(45) Date of Patent: Feb. 20, 2001

(54) MONOLITHIC CAPACITOR

(75) Inventors: Yoichi Kuroda, Fukui; Masaaki Taniguchi, Fukui-ken; Yasuyuki Naito, Takefu; Takanori Kondo, Sabae, all of (JP)

(73) Assignee: Murata Manfacturing Co., Ltd. (JP)

( * ) Notice: Under 35 U.S.C. 154(b), the term of this patent shall be extended for 0 days.

(21) Appl. No.: 09/302,458

(22) Filed: Apr. 29, 1999

(30) Foreign Application Priority Data

May 21, 1998 (JP) ................................... 10-139289

(51) Int. Cl.$^7$ ........................... H01G 4/005; H01G 4/228
(52) U.S. Cl. .................. 361/303; 361/306.3; 361/309; 361/310
(58) Field of Search ............................. 361/301.1, 301.4, 361/303–305, 306.1–306.3, 308.1, 307, 309, 311–313, 320, 321.1–321.5, 328, 329

(56) References Cited

U.S. PATENT DOCUMENTS

| | | | |
|---|---|---|---|
| 4,831,494 | * 5/1989 | Arnold et al. | 361/306 |
| 5,815,367 | * 9/1998 | Asakura et al. | 361/303 |
| 5,822,174 | * 10/1998 | Yamate et al. | 361/302 |
| 6,038,121 | * 3/2000 | Naito et al. | 361/303 |

FOREIGN PATENT DOCUMENTS 2256216    10/1990   (JP) .

* cited by examiner

Primary Examiner—Kristine Kincaid
Assistant Examiner—Eric Thomas
(74) Attorney, Agent, or Firm—Ostrolenk, Faber, Gerb & Soffen, LLP

(57) ABSTRACT

A monolithic capacitor which can reduce equivalent series inductance (ESL) thereof includes a first extension of a first internal electrode which is extended onto two sides of a capacitor itself. A second extension of the first internal electrode is extended onto a first end face; and a first external terminal electrode and a second external terminal electrode are connected to the first extension and the second extension, respectively. In addition, a third extension of a second internal electrode opposing the first internal electrode is extended onto the two sides of the capacitor and a fourth extension of the second internal electrode is extended onto a second end face. The third extension and fourth extension are connected to a third external terminal electrode and a fourth external terminal electrode, respectively. Furthermore, each width of the second extension and the fourth extension is longer than each width of the first extension and the third extension, and at the same time is not shorter than 1/8, and is more preferably 1/5 of each width of the two internal electrodes.

10 Claims, 2 Drawing Sheets

MONOLITHIC CAPACITOR

BACKGROUND OF THE INVENTION

1. Field of the Invention

Figure 1:
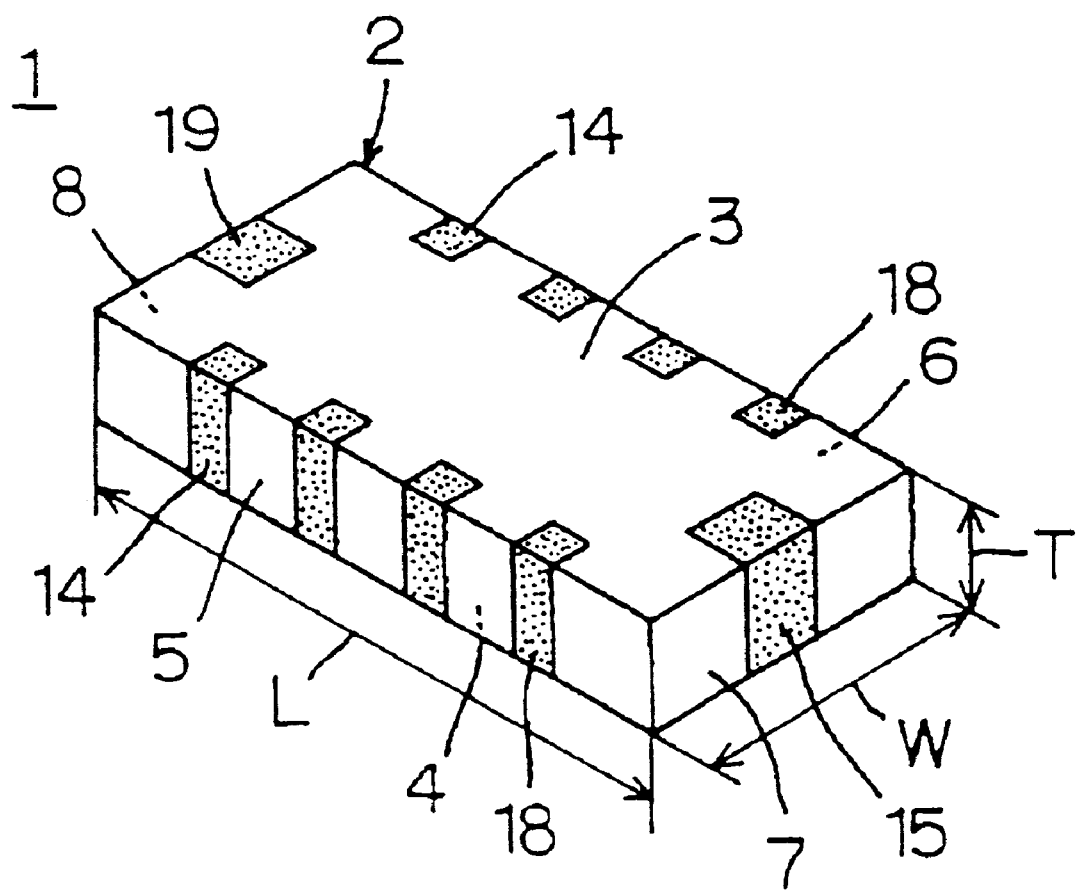

The present invention relates to a monolithic capacitor, and more particularly, relates to a monolithic capacitor which is effectively applicable for use in a high-frequency circuit.

2. Description of the Related Art

A conventional type of monolithic capacitor relating to the present invention is described in Japanese Unexamined Patent Publication No. 2-256216, etc. This type of monolithic capacitor has an arrangement in which an equivalent series inductance (ESL) is reduced for use in a high-frequency band.

In this arrangement, a plurality of first and second internal electrodes, each of which is mutually opposing through a specified dielectric layer, respectively form a plurality of extensions, which are extended onto at least one of the two opposing sides of a capacitor itself so as to form external terminal electrodes corresponding to the respective extensions; and the external terminal electrodes are disposed on the sides of the capacitor in such a manner that a plurality of first external terminal electrodes connected to a plurality of the extensions of the first internal electrode and a plurality of second external terminal electrodes connected to a plurality of the extensions of the second internal electrodes are alternately positioned.

For instance, when current flows from the first external terminal electrodes to the second external terminal electrodes, magnetic flux, the direction of which depends on the current direction, is induced; thereby, a self-inductance is produced. However, as described above, since the respective first and second external terminal electrodes are alternately positioned, the magnetic flux induced by the current is effectively offset in parts where the first and second external terminal electrodes are located adjacent to each other so that occurrence of magnetic flux can be reduced, resulting in reduction in equivalent series inductance.

On the other hand, the arrangement above has a problem: since no external terminal electrodes are positioned on two opposing end faces of the capacitor, it is expected that there is substantially no offset effect of magnetic flux near the two end faces, thus causing a hindrance to a further reduction in ESL.

SUMMARY OF THE INVENTION

Accordingly, it is an object of the present invention to provide an improved monolithic capacitor, which can more effectively achieve reduction in ESL.

This invention provides a monolithic capacitor including a body of a rectangular-parallelepiped form defined by a length dimension, a width dimension, and a thickness dimension: having (1) a first main surface and a second main surface which are mutually opposing and defined by the length dimension and the width dimension, a first side and a second side which are mutually opposing and defined by the length dimension and the thickness dimension, and a first end face and a second end face which are mutually opposing and defined by the width dimension and the thickness dimension, in which the length dimension is longer than the width dimension; (2) a plurality of dielectric layers extending in the direction of the main surfaces; and (3) at least one pair of a first internal electrode and a second internal electrode mutually opposing through a specified dielectric layer so as to form a capacitor unit.

In order to solve the problem described above in the conventional art, this monolithic capacitor provides the following arrangement:

The first internal electrode forms a first extension which is extended onto at least one of the first side and the second side and a second extension which is extended onto the first end face; a first external terminal electrode which is electrically connected to the first extension is disposed on at least one of the first side and the second side onto which the first extension is extended; and a second external terminal electrode which is electrically connected to the second extension is disposed on the first end face onto which the second extension is extended.

The second internal electrode forms a third extension which is extended onto at least one of the first side and the second side and a fourth extension which is extended onto the second end face; a third external terminal electrode which is electrically connected to the third extension is disposed on at least one of the first side and the second side onto which the third extension is extended; and a fourth external terminal electrode which is electrically connected to the fourth extension is disposed on the second end face onto which the fourth extension is extended.

In this arrangement, each width of the second extension and the fourth extension is longer than that of the first extension and the third extension, and is not shorter than $\frac{1}{6}$ of each width of the first internal electrode and the second internal electrode.

Preferably, each width of the second extension and the fourth extension is not shorter than $\frac{1}{3}$ of each width of the first internal electrode and the second internal electrode.

In addition, preferably, at least one of the first extension and the third extension includes a plurality of extensions; at least one of the first external terminal electrode and the third external terminal electrode is disposed at multiple locations on at least one of the first side and the second side to be connected to each corresponding one of the extensions; and the first external terminal electrode and the third external terminal electrode are alternately positioned thereon.

Furthermore, preferably, at least one of the first extension and the third extension includes extensions which are extended onto both the first side and the second side; and at least one of the first external terminal electrode and the third external terminal electrode is disposed on both the first side and the second side so as to be connected to each corresponding one of the extensions.

Moreover, when the capacitor itself is seen in a certain direction in the order of the first end face, the first side, the second end face, and the second side, it is preferable that the first or second external terminal electrode which is connected to the first or second extension formed on the first internal electrode and the third or fourth external terminal electrode which is connected to the third or fourth extension formed on the second internal electrode be alternately positioned.

Moreover, preferably, the first internal electrode is opposing the second internal electrode at a plurality of locations so as to form a plurality of capacitor units, which are mutually connected in parallel by the first through fourth external terminal electrodes.

Other features and advantages of the present invention will become apparent from the following description of the invention which refers to the accompanying drawings.

BRIEF DESCRIPTION OF THE DRAWING(S)

Figure 2A:
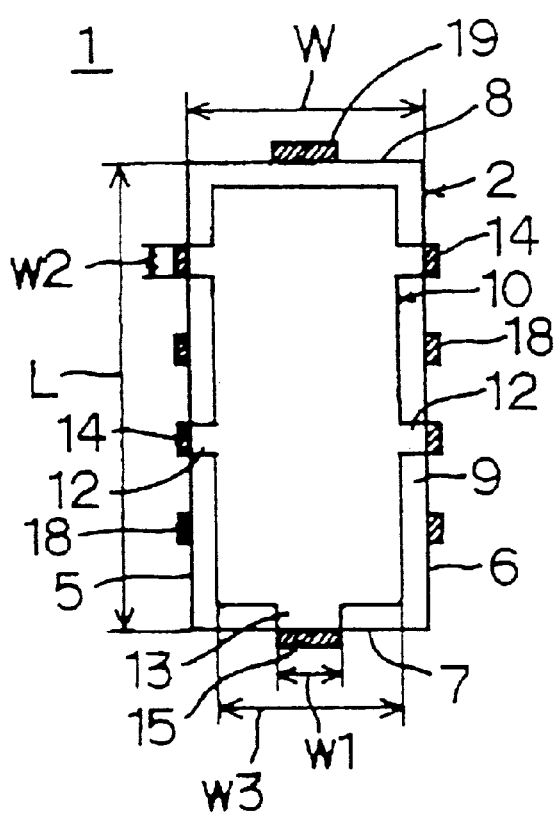
Figure 2B:
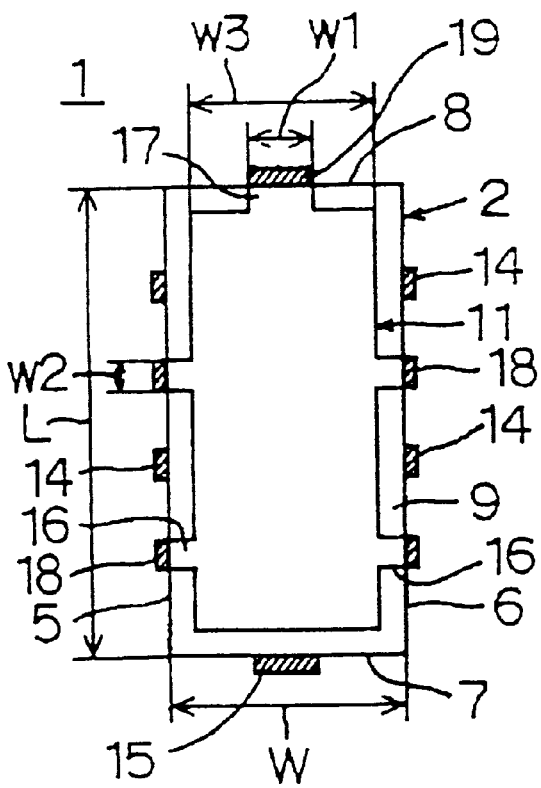

FIG. 1 is a perspective view illustrating a monolithic capacitor according to an embodiment of the present invention; and FIGS. 2A and 2B show plan, sectional views illustrating the inner structure of the monolithic capacitor shown in FIG. 1 with FIG. 2A being a sectional view in which a first internal electrode is located, and FIG. 2B being a sectional view in which a second internal electrode is located.

DESCRIPTION OF THE PREFERRED EMBODIMENT

FIGS. 1 and 2 respectively show a monolithic capacitor 1 according to an embodiment of the present invention. FIG. 1 is a perspective view of the monolithic capacitor 1; and FIGS. 2A and 2B show plan views illustrating specified sections in the internal structure of the same, in which the section shown in FIG. 2A is different from that of FIG. 2B.

The dimensions of the monolithic capacitor 1 are defined by a length dimension L, a width dimension W, and a thickness dimension T. The monolithic capacitor 1 includes a body 2 in a rectangular-parallelepiped form in which the length dimension L is longer than the width dimension W. The body 2 comprises a first main surface 3 and a second main surface 4, which are mutually opposing and defined by the length dimension L and the width dimension W; a first side 5 and a second side 6, which are mutually opposing and defined by the length dimension L and the thickness dimension T; and a first end face 7 and a second end face 8, which are mutually opposing and defined by the width dimension W and the thickness dimension T.

In addition, the body 2 has a plurality of dielectric layers 9, which extend in the directions of the main surfaces 3 and 4, and at least one pair of a first internal electrode 10 and a second internal electrode 11, which are mutually opposing through a specified dielectric layer 9 so as to form a capacitor unit.

FIG. 2A shows a section in which the first internal electrode 10 is located and FIG. 2B shows a section in which the second internal electrode 11 is located.

As shown in FIG. 2A, the first internal electrode 10 forms a plurality of first extensions 12 which are extended onto both the first side 5 and the second side 6 and a second extension 13 which is extended onto the second end face 7.

On the first side 5 and the second side 6 onto which the first extensions 12 are extended are disposed a plurality of first external terminal electrodes 14 which are electrically connected to the respective first extensions 12. On the first end face 7 onto which the second extension 13 is extended is disposed a second external terminal electrode 15 which is electrically connected to the second extension 13.

As shown in FIG. 2B, the second internal electrode 11 forms a plurality of third extensions 16 which are extended onto both the first side 5 and the second side 6 and a fourth extension 17 which is extended onto the second end face 8.

On the first side 5 and the second side 6 onto which the third extensions 16 are extended are disposed a plurality of third external terminal electrodes 18 which are electrically connected to the respective third extensions 16. On the second end face 8 onto which the fourth extension 17 is extended is disposed a fourth external terminal electrode 19 which is electrically connected to the fourth extension 17.

In terms of the monolithic capacitor 1 described above, a description will be given of the locations of the external terminal electrodes 14, 15, 18, and 19.

First, the first external terminal electrode 14 and the third external terminal electrode 18 are alternately positioned along the first side 5 and the second side 6.

When the capacitor 1 is viewed in a certain direction in the order of the first end face 7, the first side 5, the second end face 8, and the second side 6, the first external terminal electrode 14 or the second external terminal electrode 15, which is connected to the first extension 12 or the second extension 13 formed on the first internal electrode 10, and the third external terminal electrode 18 or the fourth external terminal electrode 19 which is connected to the third extension 16 or the fourth extension 17 formed on the second internal electrode 11 are found to be alternately positioned.

These arrangements can all contribute to reduction in equivalent series inductance (ESL), since there is an offset effect of magnetic flux similar to the case of the conventional case described above, leading to reduction in occurrence of magnetic flux.

Moreover, the monolithic capacitor 1 provides improved patterns for the internal electrodes 10 and 11 to reduce ESL.

In other words, each width dimension W1 of the second extension 13 and the fourth extension 17 is longer than each width dimension W2 of the first extension 12 and the third extension 16, and is not shorter than $\frac{1}{9}$ of each width dimension W3 of the first internal electrode 10 and the second internal electrode 11, and is more preferably not shorter than $\frac{1}{5}$ of the same.

As mentioned above, since the length dimension L of the capacitor 1 is longer than the width dimension W of the same, a plurality of the first external terminal electrodes 14 and a plurality of the third external terminal electrodes 18 can easily be positioned along the lengthwise direction of the capacitor 1 on the first side 5 and the second side 6 defined by the length dimension L, whereas only one second external terminal electrode 15 or fourth external terminal electrode 19 can be easily positioned on the first end face 7 and the second end face 8 defined by the width dimension W, which is relatively short.

Regarding the second extension 13 connected to the second external terminal electrode 15 and the fourth extension 17 connected to the fourth external terminal electrode 19, respectively, each width W1 of these extensions is expanded so as to prevent occurrence of inductance by moderating electric field convergence, thereby, achieving reduction in ESL. More specifically, as mentioned above, each width W1 of the second extension 13 and the fourth extension 17 is arranged longer than each width W2 of the first extension 12 and the third extension 16; and each W1 of the second extension 13 and the fourth extension 17 is arranged to be not shorter than $\frac{1}{9}$ of each width W3 of the first internal electrode 10 and the second internal electrode 11, and is more preferably not shorter than $\frac{1}{5}$ of the same. Such preferred ratios of W1 with respect to W3 come from the result of an evaluation given below.

There are provided monolithic capacitors having each differently modified ratio (W1/W3) of each width W1 of the second extension 13 and the fourth extension 17 with respect to each width W3 of the first internal electrode 10 and the second internal electrode 11; resonant frequency and capacitance of each monolithic capacitor were measured so as to calculate ESL therefrom.

In Tables 1 and 2 given below, the relationship between the ratio of W1/W3 and ESL, resonant frequency, and capacitance, are shown: Table 1 shows an evaluation in a monolithic capacitor having the length dimension L of 3.2 mm, the width dimension W of 1.6 mm, and the thickness dimension T of 0.7 mm; and Table 2 shows an evaluation in a monolithic capacitor having the length dimension L of 3.2 mm, the width dimension W of 2.5 mm, and the thickness dimension T of 0.7 mm.

TABLE 1

| W1/W3 | ESL (pH) | Resonant Frequency (MHz) | Capacitance (pF) |
| --- | --- | --- | --- |
| 1/12 | 70 | 350 | 2940 |
| 1/10 | 54 | 400 | 2940 |
| 1/9 | 35 | 500 | 2940 |
| 1/8 | 33 | 510 | 2940 |
| 1/6 | 32 | 520 | 2940 |
| 1/5 | 30 | 540 | 2940 |
| 1/4 | 30 | 540 | 2940 |
| 1/2 | 29 | 550 | 2940 |

TABLE 2

| W1/W3 | ESL (pH) | Resonant Frequency (MHz) | Capacitance (pF) |
| --- | --- | --- | --- |
| 1/12 | 93 | 230 | 5150 |
| 1/10 | 68 | 270 | 5150 |
| 1/9 | 55 | 300 | 5150 |
| 1/8 | 54 | 305 | 5150 |
| 1/6 | 54 | 305 | 5150 |
| 1/5 | 51 | 310 | 5150 |
| 1/4 | 50 | 315 | 5150 |
| 1/2 | 50 | 315 | 5150 |

As shown in Tables 1 and 2, when the ratio of W1/W3 is 1/9 or more, ESL can be substantially reduced more than when the ratio is, for example, 1/10 or less, and when the ratio is 1/5 or more, ESL can be further reduced. Since both tables show such characteristics, it is clear that the ratio of W1/W3 is preferably 1/9 or more, and is further preferably 1/5 or more, regardless of the dimensions of the monolithic capacitor.

Although the above description presents the embodiment of the present invention, various modifications are possible within the scope of the invention, such as modifying the position and number of extensions of the internal electrode, and, with respect thereto, modifying the position and number of the external terminal electrodes.

Furthermore, the above-described monolithic capacitor 1 may have an arrangement in which the first internal electrode 10 is opposing the second internal electrode 11 at a plurality of locations for forming a plurality of capacitor units so as to obtain larger capacitance, although there is no illustration thereof. In such an arrangement, a plurality of the capacitor units is connected in parallel by the first through fourth external terminal electrodes 14, 15, 18, and 19.

Therefore, according to this invention, in the mutually opposing first and second internal electrodes, the first internal electrode forms the first and second extensions, and the second internal electrode forms the third and fourth extensions so as to form a plurality of the external terminal electrodes. This leads to reduction in ESL, which is associated with offsetting of magnetic flux.

In addition, each width of the extensions which are extended onto the end faces defined by the shorter width dimension of the capacitor is longer than each width of the extensions which are extended onto the sides defined by the longer length dimension of the same, and also has the dimension which is not shorter than 1/9 of each width of the internal electrodes, so that electric field convergence at the extensions which are extended onto the end faces can be moderated. Thus, this also can contribute to reduction in ESL. Moreover, when each width of the extensions extended onto the end faces is arranged longer so as to have a dimension which is not shorter than 1/5 of each width of the internal electrodes, further reduction in ESL can be achieved.

When the following procedures are performed in this invention, much greater reduction in ESL can be enhanced by an offset of magnetic flux.

In a first procedure, among the extensions formed on the first internal electrode, the extension which is extended onto the side is a first extension, and the extension which is extended onto the end face is a second extension; and among the extensions formed on the second internal electrode, the extension which is extended onto the side is a third extension, and the extension which is extended onto the end face is a fourth extension. When the first through fourth external terminal electrodes are respectively connected to each of the first through fourth extensions, at least one of the first and third extensions has a plurality of extensions; and on at least one of the first side and the second side, at least one of the first external terminal electrode and the third external terminal electrode is disposed at multiple locations to be connected to each corresponding extension, along with the first external terminal electrodes and the third external terminal electrodes alternately disposed.

In a second procedure, at least one of the first and the third extensions has extensions which are extended onto both the first side and the second side; and at least one of the first and third external terminal electrodes is disposed on both the first side and the second side so as to be connected to each corresponding extension.

In a third procedure, when the capacitor itself is viewed in a certain direction in the order of the first end face, the first side, the second end face, and the second side, the arrangement is such that the first or second external terminal electrode which is connected to the first or second extension formed on the first internal electrode and the third or fourth external terminal electrode which is connected to the third or fourth extension formed on the second internal electrode are alternately disposed.

In this invention, when the first internal electrode is opposing the second internal electrode at a plurality of locations so as to form a plurality of capacitor units which are connected in parallel by the first through fourth external terminal electrodes, miniaturization of the monolithic capacitor with increased capacity can be achieved.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A monolithic capacitor comprising:
   a body of rectangular-parallelepiped form comprising:
   a first main surface and a second main surface;
   a first side and a second side; and
   a first end face and a second end face;
   wherein the rectangular-parallelepiped form is defined by a length dimension, a width dimension, and a thickness dimension; and the length dimension is longer than the width dimension; and
   wherein the first main surface and the second main surface are mutually opposing and defined by the length dimension and the width dimension; the first side and the second side are mutually opposing and defined by the length dimension and the thickness dimension; and the first end face and the second end face are mutually opposing and defined by the width dimension and the thickness dimension;

a plurality of dielectric layers extending in the directions of the main surfaces; and at least one pair of a first internal electrode and a second internal electrode;

wherein the at least one pair of the internal electrodes are mutually opposing through a specified dielectric layer so as to form a capacitor unit;

wherein the first internal electrode forms a first extension which is extended onto at least one of the first side and the second side, and a second extension which is extended onto the first end face;

wherein a first external terminal electrode is electrically connected to the first extension and disposed on at least one of the first side and the second side onto which the first extension is extended, and a second external terminal electrode is electrically connected to the second extension and disposed on at least the first end face onto which the second extension is extended;

wherein a second internal electrode forms a third extension which is extended onto at least one of the first side and the second side and a fourth extension which is extended onto the second end face;

wherein a third external terminal electrode is electrically connected to the third extension and is disposed on at least one of the first side and the second side onto which the third extension is extended, and a fourth external terminal electrode is electrically connected to the fourth extension and is disposed on the second end face onto which the fourth extension is extended; and wherein each width of the second extension and fourth extension is longer than each width of the first extension and the third extension, and is not shorter than 1/5 of each width of the first internal electrode and the second internal electrode.

2. A monolithic capacitor according to claim 1, wherein each width of the second extension and the fourth extension is not shorter than 1/5 of each width of the first internal electrode and the second internal electrode.

3. A monolithic capacitor according to claim 2, wherein at least one of the first extension and the third extension has a plurality of extensions; at least one of the first external terminal electrode and the third external terminal electrode is disposed at multiple locations on at least one of the first side and the second side to be connected to each corresponding one of the extensions; and the first external terminal electrode and the third external terminal electrode are alternately disposed.

4. A monolithic capacitor according to claim 1, wherein at least one of the first extension and the third extension has a plurality of extensions; at least one of the first external terminal electrode and the third external terminal electrode is disposed at multiple locations on at least one of the first side and the second side to be connected to each corresponding one of the extensions; and the first external terminal electrode and the third external terminal electrode are alternately disposed.

5. A monolithic capacitor according to one of claims 1 through 4, wherein said at least one pair of the first internal electrode and the second internal electrode is a plurality of pairs so as to form a plurality of capacitor units which are connected in parallel by the first through fourth external terminal electrodes.

6. A monolithic capacitor according to any one of claims 1, 4 or 3, wherein at least one of the first extension and the third extension has the extensions extended onto both the first side and the second side; and at least one of the first external terminal electrode and the third external terminal electrode is disposed on both the first side and the second side so as to be connected to each corresponding one of the extensions.

7. A monolithic capacitor according to claim 6, wherein when the capacitor is viewed in a direction in the order of the first end face, the first side, the second end face, and the second side, the first or second external terminal electrode connected to the first or second extension formed on the first internal electrode and the third or fourth external terminal electrode connected to the third or fourth extension formed on the second internal electrode are alternately disposed.

8. A monolithic capacitor according to claim 6, wherein said at least one pair of the first internal electrode and the second internal electrode is a plurality of pairs so as to form a plurality of capacitor units which are connected in parallel by the first through fourth external terminal electrodes.

9. A monolithic capacitor according to any one of claims 1, 2, 4 or 3, wherein when the capacitor is viewed in a direction in the order of the first end face, the first side, the second end face, and the second side, the first or second external terminal electrode connected to the first or second extension formed on the first internal electrode and the third or fourth external terminal electrode connected to the third or fourth extension formed on the second internal electrode are alternately disposed.

10. A monolithic capacitor according to claim 9, wherein said at least one pair of the first internal electrode and the second internal electrode is a plurality of pairs so as to form a plurality of capacitor units which are connected in parallel by the first through fourth external terminal electrodes.

* * * * *